Aug. 20, 1957  R. A. WHITLOCK, JR  2,803,347
MIXED BED DEIONIZING APPARATUS
Filed April 30, 1954
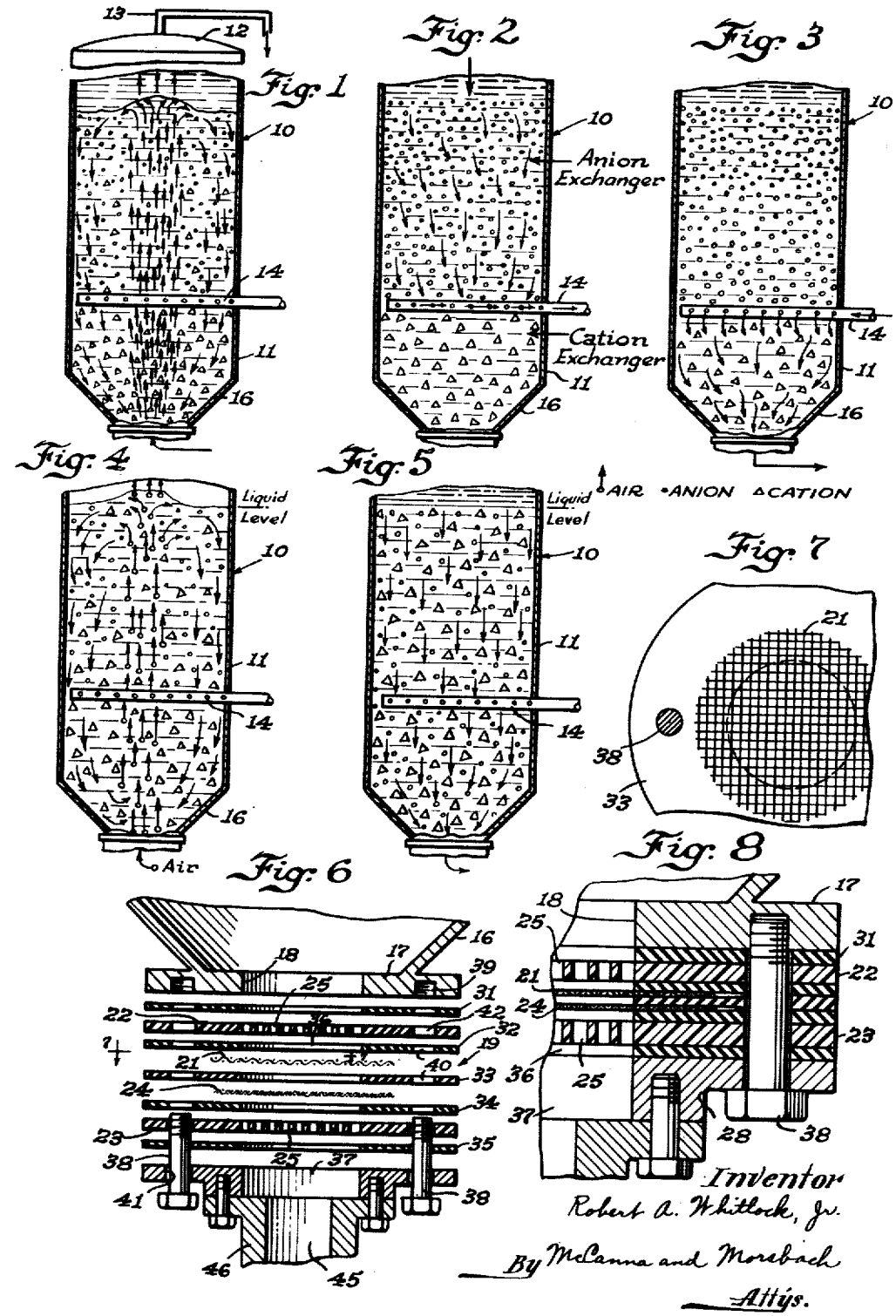

United States Patent Office 2,803,347
Patented Aug. 20, 1957

2,803,347
MIXED BED DEIONIZING APPARATUS

Robert A. Whitlock, Jr., Rockford, Ill., assignor to Aqua-Matic Inc., Rockford, Ill., a corporation of Illinois Application April 30, 1954, Serial No. 426,707

2 Claims. (Cl. 210—190)

This invention relates to a mixed bed deionizing apparatus.

In a mixed bed water treating apparatus, the anion and cation exchange materials are contained in a single tank and, during the service run, the anion and cation exchange materials are intimately mixed in the tank so as to present an almost infinite series of anion and cation exchange beds to the untreated solution as it flows down through the tank. In order to regenerate the bed, it is necessary to separate the anion and cation exchange materials and regenerate them separately.

Previously mixed bed watertreating apparatus have commonly employed a tank having a flat or shallow dome shaped bottom and a lower distributor positioned adjacent the bottom of the tank through which the treated water flows out during the service run. Such distributors have a plurality of laterally extending arms which extend over the bottom of the tank to prevent channeling of the water through the bed which would result in the production of low quality water before the bed was completely exhausted. During the backwash stage of the regeneration cycle, water is admitted through the lower distributor and flows upwardly through the bed of exchange material and out through the top of the tank. The exchange materials are chosen so as to have different apparent specific gravities whereby the backwashing effects stratification of the materials with the heavier materials such as the cation exchange resins located at the bottom and the anion exchange resins located above. An interface distributor is interposed in the tank between the portions of the bed and the portions of the bed are regenerated separately by passing a caustic regenerant through the anion exchange resin and an acid regenerant through the cation exchange resin. The bed portions are thereafter thoroughly mixed by passing a stream of air or air and water upwardly through the bed from the lower distributor and, after rinsing, the apparatus is ready to be placed back into service.

In the mixed bed exchange apparatus employing a lower distributor disposed above the bottom of the tank, part of the exchange material is commonly pocketed between the lower distributor and the bottom of the tank and is not dislodged during the backwashing or mixing stages of the regeneration cycle. After repeated regenerations, this residue contains both anion and cation exchange resins. When the cation exchange resin is regenerated with an acid regenerant, the residual exchange material is also subjected to the acid and consequently the anion exchange resins contained in the residue will be completely exhausted while the cation exchange resins in the residue on the tank bottom will be regenerated. The subsequent rinsing of the cation exchange bed does not remove all of the excess acid in the residual material and, since this residual material is not intimately mixed with the other resins during the remixing of the beds, the final rinse time after the bed is thoroughly intermixed is very long in order to leach off the excess acid and obtain water of the desired purity. The overall purity of the water obtained is reduced by the presence of the residual material on the bottom of the tank and, because of the long final rinse time required, which may amount to 10% of the normal service run, the total quantity of treated water which can be obtained between regenerations is reduced. The foregoing imperfections and disadvantages of the prior art apparatus of this type are eliminated by the present invention.

An important object of this invention is the provision of an improved mixed bed water treating apparatus in which the final rinse time necessary to produce high quality water is reduced thereby increasing the quantity of treated water which may be produced by the apparatus between regenerations.

Another object of this invention is the provision of an improved mixed bed water treating apparatus which effects complete separation of the anion and cation exchange materials in the tank during the backwashing stage of the regeneration cycle so that the exchange materials may be separately and completely regenerated.

Another object of this invention is the provision of an improved mixed bed water treating apparatus which effects complete and thorough intermixing of the exchange materials in the tank during the mixing stage of the regeneration cycle.

Another object of this invention is the provision of a mixed bed water treating apparatus so arranged that the entire bed is contacted by the untreated solution as it passes through the tank so that all of the exchange material is efficiently utilized thereby increasing the quantity of high quality water that can be produced between regenerations.

Yet another object of this invention is the provision of a mixed bed water treatment apparatus wherein the time required for intermixing of the resins is reduced, thereby reducing attrition of the resin.

A further object of this invention is the provision of a mixed bed water treatment apparatus which is arranged so that the lower distributor is accessible and replaceable from outside the tank without having to remove the resin bed from the tank.

Still another object of this invention is the provision of a mixed bed water treating apparatus of simple and economical construction which is highly adapted for the purposes intended.

These, together with various ancillary objects and advantages of the invention will be more readily apparent as the same becomes better understood by reference to the following detailed description when taken in connection with the accompanying drawings wherein:

Figure 1 is a vertical sectional view through the treatment tank illustrating the flow of fluid into the tank during the backwashing stage of the regeneration cycle;

Fig. 2 is a vertical sectional view through the tank illustrating the flows of fluid through the bed of anion exchange material during the regeneration thereof;

Fig. 3 is a vertical sectional view through the tank illustrating the flow of fluid through the cation exchange material, during the regeneration thereof;

Fig. 4 is a fragmentary vertical sectional view through the tank illustrating the flow of fluid therethrough during the mixing stage of the regeneration cycle;

Fig. 5 is a fragmentary vertical sectional view through the treatment tank illustrating the flow of fluid therethrough during the final rinse and service run stages of the regeneration cycle;

Fig. 6 is an exploded view of the screen assembly on the bottom of the treatment tank;

Fig. 7 is a fragmentary horizontal sectional view taken through the screen assembly just above the resin supporting screen; and Fig. 8 is a fragmentary vertical sectional view of the screen assembly shown assembled on the bottom of the tank.

Reference is now made more specifically to the accompanying drawings wherein there is illustrated a mixed bed deionization apparatus including a tank 10 containing both anion and cation exchange resins. The tank 10 is arranged so that the exchange material contained therein may be regenerated in the conventional manner by separation of the anion and cation exchange resins, regeneration of the components, and remixing of the anion and cation exchange resins to form a uniform bed. The various conduits and valves for establishing the various flows of fluid, regenerant and air to and from the apparatus during the regeneration cycle and return to service are well-known, and as they form no part of the present invention, further illustration and description thereof is deemed unnecessary.

The tank 10 is preferably formed with a cylindrical side wall 11 and a top wall 12 from which one or more conduits 13 extend to enable the various fluids to be introduced and withdrawn from the top of the tank. An interface distributor 14 is disposed in the tank and spaced above the bottom thereof a distance corresponding to the depth of the lower bed of exchange material, here shown as the cation exchange resin. When the cation and anion exchange materials are separated in the tank, the cation exchange material is disposed below the interface distributor, as shown in Figs. 2 and 3, and the anion exchange material rests on the top of the cation bed and extends above the interface distributor. The relative proportions of the anion and cation exchange materials vary with the different exchange materials used, the average ratio by volume being roughly three parts of anion exchange resin to two parts of cation exchange resin. The freeboard or space between the top of the bed of exchange material and the top of the tank is generally made between 75 to 100% of the depth of the bed to assure adequate room in the tank for expansion of the bed during backwashing and mixing and also to assure that the untreated solution entering the top of the tank will be uniformly distributed over the surface of the bed.

In accordance with the present invention, the bottom of the tank is formed with a frusto-conical wall 16, the slope of which is made at least slightly greater than the angle of repose of the exchange material in the solution being treated, the angle of repose of the exchange resin and water being approximately 30°. This construction is provided to assure that the exchange material will flow freely down the sloping bottom wall during the backwashing and mixing stages of the regeneration cycle and, additionally, assures that the solution flowing through the tank during the service run will uniformly contact all of the exchange material in the tank. A flat bottom plate 17 is secured to the lower end of the frusto-conical bottom wall 16 and a central outlet port 18 is provided in the bottom plate through which the various fluids are introduced and withdrawn from the bottom of the tank. A screen assembly 19 is secured to the bottom plate and overlies the outlet port 18 thereat to prevent the passage of exchange material out through the bottom of the tank.

The screen assembly comprises a resin supporting screen 21 of a foraminous or reticulated construction having a mesh opening sufficiently small to prevent the passage of exchange material therethrough. Because of the corrosive nature of the reagents and effluents which flow through the outlet port 18 in the bottom plate, the screen is formed of a non-corrosive material such as plastic. In order to mechanically reinforce the resin supporting screen, a plurality of grids 22 and 23 are disposed above and below the screen 21 respectively and a secondary reinforcing screen 24 its interposed between the lower grid 23 and the resin supporting screen 21. The grids 22 and 23 are formed of a non-corrosive material such as plastic and are preferably in the form of flat disks having a plurality of apertures 25 in the central portion thereof to permit the passage of fluid therethrough to and from the outlet port 18. The interface between each of the grids, screens, the bottom plate 17, and the mounting flange 28 are sealed by means of disk-like gasket members 31, 32, 33, 34 and 35 of a deformable material such as rubber, each of which gasket members has a central opening 36 therein of a diameter equal to the opening of the outlet port 18, and a plurality of radially spaced holes 40. The mounting flange 28 is also provided with a central opening 37 for the passage of the fluid therethrough and a plurality of radially spaced holes 41. As best shown in Fig. 6, the mounting flange 28 is attached to the bottom plate 17 by means of studs 38 which extend through the openings 41 in the mounting flange and through the aligned openings 40 in the gasket members and the openings 42 in the grid members 22 and 23 into the tapped holes 39 on the bottom plate.

The screen members 21 and 24 are here shown to be of a reticulated construction. These screen members are dimensioned smaller than the gasket members so that the gasket members 32 and 33 on opposite sides of the resin supporting screen 21 and the gasket members 33 and 34 on opposite sides of the reinforcing screen 24 project beyond the peripheries of the screens. When the screen assembly is clamped to the bottom plate 17, as best shown in Fig. 8, the gasket members are compressed against the screens to resiliently grip the screens therebetween and the peripheries of the gasket members are drawn into snug contact to form a peripheral seal around the screens and thereby prevent thte leakage of fluid.

The screen 21 supports the bed of exchange material and prevents the passage of the material therethrough. This exchange material partially fills the interstices in the screen and thereby effectively reduces the open area of the screen. Accordingly, the area of the outlet port 18, the area of the corresponding openings 36 in the gasket members, and the total area of the openings 25 in the grids 22 and 23 are made larger than the cross-sectional area of the passage 45 in the outlet pipe 46 to the service line by a factor dependent upon the reduction in the effective area of the outlet port 18 due to the screen 21 and the further reduction in the effective open area of that screen caused by the resin material resting thereon. The area of the outlet should therefore be roughly 2½ times the area of the outlet pipe. Since the resin does not pass through the screen 21, the lower reinforcing screen 24 may be of a relatively finer mesh to increase the strength thereof, without reducing the effective open passage area of that screen below that of the screen 21 when the resin is disposed thereon. This lower screen, which is of a relatively finer mesh is also formed of a corrosive resisting material having adequate strength to support the screen 21.

During the regeneration cycle, the bed is first separated into the cationic and anionic components, the components regenerated separately, and the bed thereafter mixed. During the normal service run, the bed is in the condition shown in Fig. 5 wherein the cation and anion exchange resins are uniformly mixed throughout the tank. The solution entering the top of the tank flows downwardly therethrough and out through the outlet port 18 in the bottom plate and through the screen assembly 19. Since the bottom wall 16 of the tank is frusto-conical in shape, the water or solution flowing downwardly through the tank will uniformly contact the bed of exchange material and not leave any dead spots adjacent the bottom of the tank as occurs when a flat or shallow dished bottom is used on the tank.

When regenerating the bed, a stream of water is caused to flow in a reverse direction through the bed upwardly from the bottom during the backwashing stage of the regeneration cycle. With the present apparatus, the circulation of water and material during the initial stage of the backwash phase is best shown in Fig. 1 wherein it is seen that the water flows upwardly through the central part of the tank carrying the exchange material therewith, the exchange material flowing outwardly and downwardly along the side walls of the tank and the excess water flowing out through the conduit 13 in the top of the tank. After a short time interval the back flow of water through the tank loosens the bed and causes the latter to be suspended in the tank, substantially filling the same. The backwash water introduced at the bottom of the tank then flows upwardly in the tank at a substantially uniform rate across the tank and maintains the bed suspended so that the heavier particles of cation exchange material, while thus suspended, settle towards the bottom of the tank with the lighter particles of anion exchange material suspended in the upper portion of the tank. When the flow of backwash water is stopped, the resins settle out of suspension with the cation resin below the interface distributor and the anion resins above the interface distributor.

Thereafter, the upper anion exchange bed is regenerated by passing a caustic regenerant therethrough downwardly from the top of the tank, the effluent flowing out through the interface distributor. A short rinse through the anion exchange bed follows the regeneration thereof to remove the excess caustic regenerant. The cation exchange bed is similarly regenerated by passing an acid regenerant through the interface distributor downwardly through the cation exchange material and out through the discharge port 18, the regeneration of the cation exchange material also being followed by a short rinse to remove the excess acid.

In order to intermix the beds of exchange material, the liquid level in the tank is drawn down to the level of the top of the bed and a stream of compressed air is introduced through the port 18. Since the air is introduced centrally of the tank at the bottom thereof, it produces an air-lift pump effect in which the rising air carries the exchange material along the axis of the tank upwardly therewith through the bed, the excess air passing off through the conduit 13 in the top of the tank. As best shown in Fig. 4, the material, which is carried upwardly through the center of the bed by the air, passes outwardly and downwardly along the side walls and inwardly along the bottom wall 16 where it is again lifted by the air upwardly. Since the water level in the tank is at the level of the top of the bed, the particles do not separate but are instead circulated and thoroughly intermixed. Because of the aforementioned circulation of the resins upwardly in the center of the tank and then downwardly along the side walls to the frusto-conical bottom where the resin is again lifted by the upwardly flowing air stream so that there are no "dead spots" wherein the resin in the tank is not contacted by the air stream to be mixed with the other resin, the duration of the air-mix time required to produce complete mixing of the bed is reduced. The attrition of the resins is therefore also reduced so that the losses due to the floating away during backwashing in subsequent regenerations, of the fine resin particles caused by attrition, is also reduced.

After intermixing, the bed is subjected to a final rinse. Because of the complete separation of the exchange materials before regeneration thereof, and the absence of dead spots in the tank which contain exhausted resins and excess regenerant, the final rinse time is greatly reduced. It has been found in practice that a final rinse of approximately two gallons per cubic foot is sufficient to produce water of a quality of 100,000 to 200,000 ohms specific resistivity.

The frusto-conical shape of the bottom wall 16 together with the screen assembly 19 eliminates the necessity of providing a lower distributor in the tank, thereby simplifying the construction of the apparatus and eliminating the "dead area" below the distributor. In addition, the frusto-conical bottom on the water treating apparatus causes the fluid flowing downwardly through the tank during the service run to uniformly contact the bed of exchange material, and during the backwashing and mixing stages of the regeneration cycle, the frusto-conical bottom conveys the exchange material to the centrally disposed port 18 so that the exchange material is contacted by the fluid flowing upwardly therethrough. This effects more complete suspension of the exchange material in the fluid during the backwashing operation so that complete stratification or separation is effected, the construction also providing more complete intermixing of the resins during the mixing cycle. In this manner, the dead spots which tend to occur adjacent the bottom of the tank in conventional water treating apparatus of the mixed bed deionization type, is obviated.

In the event it is necessary to service or replace the screen assembly after a period of use, it is only necessary to drain the water from the tank. The screen assembly may then be removed from the tank, from externally thereof, the resin in the tank bridging the opening 18 in the bottom thereof so that only a small amount of resin drops from the tank. Thus, it is not necessary to remove the resin from the tank as is required when servicing or replacing the lower distributors in conventional tanks.

The minimum slope of the frusto-conical bottom wall is preferably chosen so as to be slightly greater than the angle of repose of the exchange material in water. However, on smaller sized tanks, the slope of the bottom may be made materially greater than the angle of repose of the exchange material to insure free flowing of the exchange material down the bottom wall, without materially increasing the overall height of the tank. In the accompanying drawings, a tank having a bottom wall slope of 45° is illustrated.

I claim:

1. In a mixed bed deionization apparatus, the combination of an upstanding tank containing cation and anion exchange materials having different apparent specific gravities, cation and anion exchange resins when the latter are separated, a lower conduit for passing fluid to and from the bottom of the tank, said tank having a frusto-conical bottom wall extending downwardly and inwardly and having an opening at the lower end thereof larger than the flow area of said lower conduit, a screen assembly including a flat reticulated screen formed of non-corrosive material for supporting the exchange materials directly thereon and having a fine mesh sufficiently small to prevent the passage of the exchange material therethrough, a pair of thin resilient gaskets disposed on opposite sides of the screen and having a central opening substantially equal to the opening in said bottom wall, said gaskets extending beyond the peripheries of said screen, a pair of rigid perforate disks disposed on opposite sides of said gasket members and extending outwardly beyond the periphery of said screen, said disks having a plurality of openings therein larger than the openings in said screen and uniformly distributed over said central openings in said gaskets, said grids being arranged to engage and support said screen when the latter is distended during flow through the apparatus whereby to prevent rupturing of said screen and dislodgment thereof from between said gaskets, a mounting flange having a central opening therein for clamping the peripheries of said grids and said gaskets to said bottom wall, and means for attaching said lower conduit to said mounting flange in communication with the opening therein.

2. In a mixed bed deionization apparatus, the combination of an upstanding tank containing cation and anion exchange materials having different apparent specific gravities, said tank having a frusto-conical bottom wall extending downwardly and inwardly and having an opening at the lower end thereof, means on said bottom wall defining a flat annular face around said opening in said bottom wall, a screen assembly for supporting the exchange materials directly thereon including a screen member formed of non-corrosive plastic material having openings therein sufficiently small to prevent the passage of the exchange material therethrough, a supporting grid disposed at the underside of said screen and having openings therein larger than the openings in said screen, said supporting grid closely underlying said screen to engage and support said screen when the latter is distended during flow through the apparatus whereby to prevent rupturing of said screen, a mounting flange having a central opening for clamping said screen and said supporting grid to said flat annular face on the bottom wall, gasket means for sealing the interfaces between said screen, said grid, said flange and said flat annular face, and a lower conduit connected to said mounting flange in communication with the opening therein for passing treated liquid from the tank during service and for passing backwash liquid and air upwardly into the tank during regeneration of the beds.

References Cited in the file of this patent

UNITED STATES PATENTS

| Number | Name | Date |
|---|---|---|
| 300,612 | Kester | June 17, 1884 |
| 559,096 | Bowden | Apr. 28, 1896 |
| 691,545 | Holland | Jan. 21, 1902 |
| 1,005,366 | Tousley | Oct. 10, 1911 |
| 1,172,728 | Perkins | Feb. 22, 1916 |
| 1,262,317 | Finney et al. | Apr. 9, 1918 |
| 1,628,541 | Johnson | May 10, 1927 |
| 1,692,939 | Johnson | Nov. 27, 1928 |
| 1,703,440 | Duke | Feb. 26, 1929 |
| 1,704,051 | McGill | Mar. 5, 1929 |
| 1,745,421 | Higgins | Feb. 4, 1930 |
| 1,940,965 | Nash | Dec. 26, 1933 |
| 2,127,397 | Freelander | Aug. 16, 1938 |
| 2,666,741 | McMullen | Jan. 19, 1954 |
| 2,692,244 | Kunin et al. | Oct. 19, 1954 |

UNITED STATES PATENT OFFICE

CERTIFICATE OF CORRECTION

Patent No. 2,803,347

August 20, 1957

Robert A. Whitlock, Jr.

It is hereby certified that error appears in the printed specification of the above numbered patent requiring correction and that the said Letters Patent should read as corrected below.

Column 6, lines 39 and 40, strike out "cation and anion exchange resins when the latter are separated,".

Signed and sealed this 8th day of October 1957.

(SEAL)
Attest:

KARL H. AXLINE
Attesting Officer

ROBERT C. WATSON
Commissioner of Patents